United States Patent [19]
Koso

[11] Patent Number: 4,859,999
[45] Date of Patent: Aug. 22, 1989

[54] PATTERN-BOUNDARY IMAGE GENERATION SYSTEM AND METHOD

[75] Inventor: Dusan A. Koso, Cambridge, Mass.

[73] Assignee: Gerber Scientific Instrument Company, Inc., South Windsor, Conn.

[21] Appl. No.: 887,652

[22] Filed: Jul. 21, 1986

[51] Int. Cl.[4] .......... G01B 11/24
[52] U.S. Cl. .......... 340/799; 340/798; 340/728; 358/106; 382/8
[58] Field of Search .......... 340/799, 798, 750, 721, 340/703, 728; 382/8; 358/101, 106, 107

[56] References Cited

U.S. PATENT DOCUMENTS

| | | | |
|---|---|---|---|
| 4,074,254 | 2/1978 | Belser et al. | 340/799 |
| 4,121,283 | 10/1978 | Walker | 340/703 |
| 4,225,861 | 9/1980 | Langdor et al. | 340/703 |
| 4,308,532 | 12/1981 | Murphy | 340/728 |
| 4,482,979 | 11/1984 | May | 340/750 |
| 4,509,043 | 4/1985 | Mossaides | 340/703 |
| 4,648,053 | 3/1987 | Fridge | 358/101 |

*Primary Examiner*—John W. Caldwell, Sr.
*Assistant Examiner*—Alvin Oberley
*Attorney, Agent, or Firm*—Joseph S. Iandiorio; Michael L. Sheldon

[57] ABSTRACT

A system for rapidly generating an image of a pattern in successive lines each being formed of a plurality of pixels, the system storing the previously generated line, producing one or more replacement pixels, and providing successively generated lines of the image by selectively delivering stored pixels or replacement pixels in accordance with commands defining the boundaries of the pattern. The pixels of the previously generated line are updated with the replacement pixels.

20 Claims, 6 Drawing Sheets

PATTERN-BOUNDARY IMAGE GENERATION SYSTEM AND METHOD

FIELD OF INVENTION

This invention relates to a system for rapidly generating two-dimensional images and more particularly to such a system which reconstructs patterns of solid lines. The system is especially suited for quickly depicting the location of wires in printed wiring boards.

BACKGROUND OF INVENTION

Objects such as printed wiring boards containing two-dimensional images require time-consuming inspection to provide quality control. Manual inspection is tedious and of varying accuracy. Presently, computer-aided machine inspection requires tremendous data processing ability: digital representation of a two-dimensional image presents substantial and often insurmountable computational difficulties.

Copper circuits of varying complexity are normally printed over a 16×22 inch area of a printed wiring board and can be depicted as a pattern of solid lines. The lines vary in width and are positioned at differing locations over the printing wiring board. Improper printing of the lines renders a circuit inoperative. There is a need for machines which can rapidly compare the actual printed patterns with predetermined, desired patterns.

Geometrically, a solid two-dimensional line having a known width can be represented using differing amounts and types of information. Generally, methods using fewer bytes of information are preferred for computer processing. One method identifies the beginning x,y coordinate, the end x,y coordinate, and the width perpendicular to the one-dimensional line defined by the beginning and end coordinates. This method therefore requires five numbers: four for the coordinates and one for width. Another method applies a vector format to represent a solid line. A vector having a beginning x,y point is defined in length, direction, and width. Five numbers are also used in the vector method: two numbers for the beginning coordinate and three for the dimensions of the solid line. Alternatively, a solid line may be represented using eight coordinates to define the four corners of line.

Although these representative methods allow succinct notation of a two-dimensional image, each such 37 compression" of the image requires conversion during re-creation or generation of the image in its entirety. These compression methods presently do not readily lend themselves to the raster format of sequential line-by-line observation or generation of a two-dimensional image. For large, complex images such as a 16×22 inch printed wiring board, present representational methods are not economically feasible.

Typically a software program must convert image information into this raster format to enable a conventional CRT screen to display the image. Along each raster line, that is, a horizontal row of pixels, the program designates whether the raster line intercepts the image and, if so, where to begin and end activating the pixels necessary to display the image. Using the compressed image information, the program must identify for each raster line the beginning pixel and the end pixel or the beginning pixel and the number of pixels following that pixel. Presently, this identification process is relatively slow and time-consuming; its limitation becomes prohibitive for rapid depiction of printed wiring boards.

SUMMARY OF INVENTION

It is therefore an object of this invention to provide an improved image generator for rapidly generating two-dimensional images.

It is a further object of this invention to provide such an image generator which represents patterns of lines having varying lengths and widths.

It is a further object of this invention to provide such an image generator which actively alters stored image values only when the lines change in dimension within the portion of the image currently being generated.

It is a further object of this invention to provide such an image generator which minimizes computational demands.

It is a further object of this invention to provide such an image generator which depicts the layout of printed wiring boards.

This invention results from the realization that a truly effective system for generating two-dimensional images can be achieved by using corner-coordinates to represent the image and selectively updating a device for storing the previous image line.

This invention features a system for rapidly generating an image of a pattern in successive lines each being formed of a plurality of pixels. There are means for storing the previously generated line, means for producing one or more replacement pixels, output means for providing successively generated lines of the image, and control means for selectively delivering output of one of the means for storing and the means for producing to the output means in accordance with commands defining the boundaries of the pattern to generate the successive lines of the image. This system also includes means for updating the means for storing with the replacement pixels from the means for producing.

In one embodiment the means for producing, responsive to the control means, produces for each output to be delivered one of a plurality of types of replacement pixels. The control means includes means for providing commands defining the pattern by its corner-coordinates and the means for providing includes command memory means for storing the defining commands.

In another embodiment, the control means further includes means for interpreting the defining commands into successive pairs of pattern coordinate instructions and pattern reproduction instructions and the control means selectively delivers the output of the means for storing and the means for producing in response to each pattern reproduction instruction when its respective pattern coordinate instruction is met. The control means further includes means for decoding the pattern coordinate instructions into line position instructions and pixel position instructions and means for decoding the pattern reproduction instructions into line advance instructions, pixel copy instructions, and pixel alteration instructions. The control means further includes advancement means, responsive to the line advance instructions and line position instructions, for enabling the control means to deliver the entire output of the means for storing to the output means. The control means further includes copy means, responsive to the pixel copy instructions and the pixel position instructions, for enabling the control means to deliver one or more successive pixels from the means for storing to the output means. The control means may further include replacement pixel. directing means, responsive to the pixel alteration instructions and the pixel position instructions, for enabling the means for producing to produce one or more successive directed replacement pixels.

In yet another embodiment, the means for providing produces a series of preselected commands defining a wire pattern on a printed wiring board and the pixels represent the presence and absence of wire on the board. The control means includes pixel counter means for indicating pixel position as the pixels are successively delivered and includes line counter means for indicating line position as the lines are successively delivered. The control means further includes initializing means for directing the means for producing and the means for updating to set all of the pixels stored in the means for storing to the same value. The output means includes output memory means for storing the line most recently delivered and the means for updating is responsive to the output memory means to update the means for storing the previous line.

This invention also features a method of rapidly generating an image of a pattern in successive lines each being formed of a plurality of pixels, including providing a series of commands defining the boundaries of the pattern, storing a line of the image, and successively identifying, as instructed by the defining commands, stored pixels as pixels to be read out or pixels to be altered. The method further includes successively reading out unaltered stored pixels identified to be read out and altering the one or more pixels identified to be altered. Each altered pixel is stored to replace its respective unaltered pixel, and the pixels to be read out and the altered pixels are provided to generate the successive lines of the image.

DISCLOSURE OF PREFERRED EMBODIMENT

Other objects, features and advantages will-occur from the following description of a preferred embodiment and the accompanying drawings, in which.

This invention may be accomplished by a system which generates line-by-line an image of a pattern by storing the previously generated line represented by pixels, that is, image values, and selectively updating the stored pixels according to commands defining the boundaries of the pattern. Replacement pixels are produced to accomplish the updating. The stored pixels in combination with the replacement pixels are provided to an output circuit to reconstruct the pattern.

Figure 1:
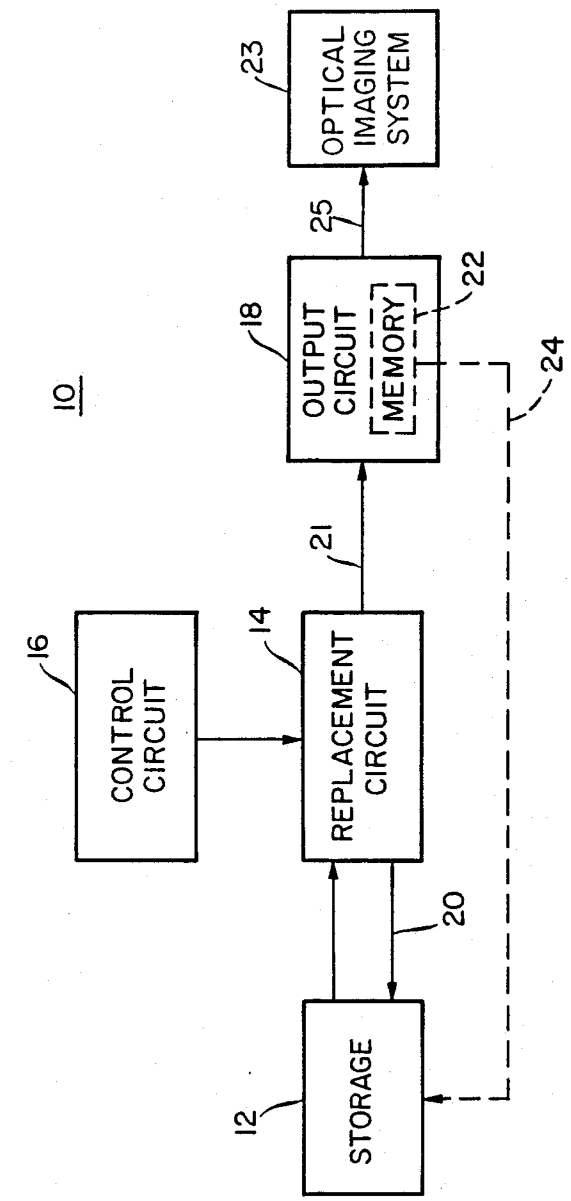
FIG. 1 is a block diagram of an image generator according to this invention.

Image generator 10, FIG. 1, successively reads pixels out of storage 12 and either passes them unaltered through replacement circuit 14 to output circuit 18 or substitutes one or more replacement pixels for corresponding stored pixels. The previously generated line of pixels is stored in storage 12. To generate the next line of the image, the pixels are successively passed through replacement circuit 14 which substitutes replacement pixels as commanded by control circuit 16. Control circuit 16 causes replacement circuit 14 to pass the stored pixels unaltered to output circuit 18 until the pattern changes in relation to the previous line. When the pattern changes, replacement circuit 14 produces new pixel values of the type directed by control circuit 16.

After storage 12 has provided a pixel to replacement circuit 14, that pixel is returned on line 20 unaltered or with a replacement pixel substituted for it to selectively update storage 12 as required. Alternatively, output circuit 18 contains memory 22 which accumulates the pixels provided through replacement circuit 14 and returns the pixels of the present line to storage 12 on line 24, shown in phantom. In the latter case line 20 is not required; in either case, image generator 10 functions as a recirculating delay line which is selectively updated according to commands defining the boundary of the pattern.

Figure 2A:
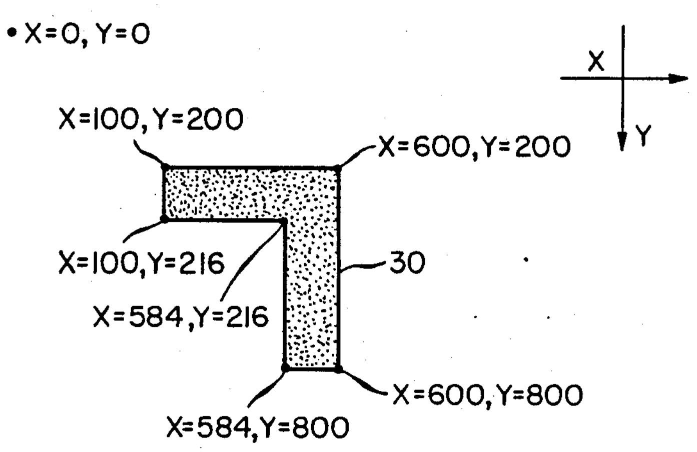
FIG. 2A is an illustration of a line defined by corner-coordinates.

The pattern to be generated and the commands defining the boundaries of the pattern are illustrated in FIG. 2A. Pattern 30 is a black right angle line disposed on a white background. Using x, y coordinates, the location of pattern 30 can be precisely defined in relation to point x=0, y=0 by specifying the corner-coordinates of pattern 30. Lines y=0 through y=199 are entirely white and identical with one another. At line y=200, however, the pixels change from white to black at x=100. An image generator reconstructing pattern 30 must generate black pixels from x=100 to x=600 along line y=200. The remaining pixels along line y=200 are white, that is, identical with those of lines y=0 through y=199 from x=601 to the end of the line.

Once the image generator is updated such that black pixels replace the white pixels from x=100 to x=600 along a line, the image generator repeatedly provides the stored generated line until line y=217; lines y=200 to y=216 are identical with each other. Along line y=217, however, the pixels between x=100 and x=583 must be changed from black to white. Once this is accomplished, the lines do not require updating until line y=801 where pixels at x=584 through x=600 must be replaced with white pixels The commands defining the boundaries of pattern 30 are illustrated in Table I. W represents the command to set pixels to white, B represents the command to set pixels black G (not shown) represents the command to identify pixel values as gray pixels, and C instructs the storage 12 that pixels are to be copied. These pattern reproduction commands are implemented at the indicated pattern coordinate. For example, along line 200 the stored pixels are copied from x=0 to x=99, black replacement pixels are produced and substituted for the stored pixels from x=100 to x=600, and the stored pixels from x=601 to the end of the line are copied unaltered.

A instructs the system to advance line-by-line, that is, to continuously read out stored values without pixel replacement, until the indicated line is reached. The C command at x=0 can be eliminated if the image generator automatically begins copying pixels at the start of a line unless a pixel replacement command is designated for that pixel.

TABLE I

IMAGE GENERATION OF FIG. 2A USING CORNER-COORDINATES

| | |
|---|---|
| W 0 | (sets the background to white) |
| A 1 | (advance to line 1) |
| C 0 | (start copying at x = 0) |
| A 200 | (advance to line 200) |
| C 0 | (start copying at x = 0) |
| B 100 | (start black at x = 100) |
| C 601 | (start copying at x = 601) |
| A 217 | |
| C 0 | |
| W 100 | |
| C 584 | |
| A 800 | |
| C 0 | |
| W 584 | |
| C 601 | |
| A xxx | (advance to last line) |

In one application, an image generator according to this invention is combined with an optical imaging system 23 via output line 25, FIG. 1,; for inspecting a printed wiring board. The image generator rapidly generates an image which is to be compared with the manufactured pattern on the printed wiring board. The manufactured pattern must replicate the generated image within certain tolerances, e.g., a wire which is optimally 0.008 in. wide must be at least 0.007 in. wide and no wider than 0.010 in. The generated image can include these tolerances by designating the required absence of a line as a white pixel, the required presence of a line as a black pixel, and acceptable variances as a third type of pixel such as gray. Each pixel represents a 0.0005 square inch portion of the pattern.

Figure 2B:
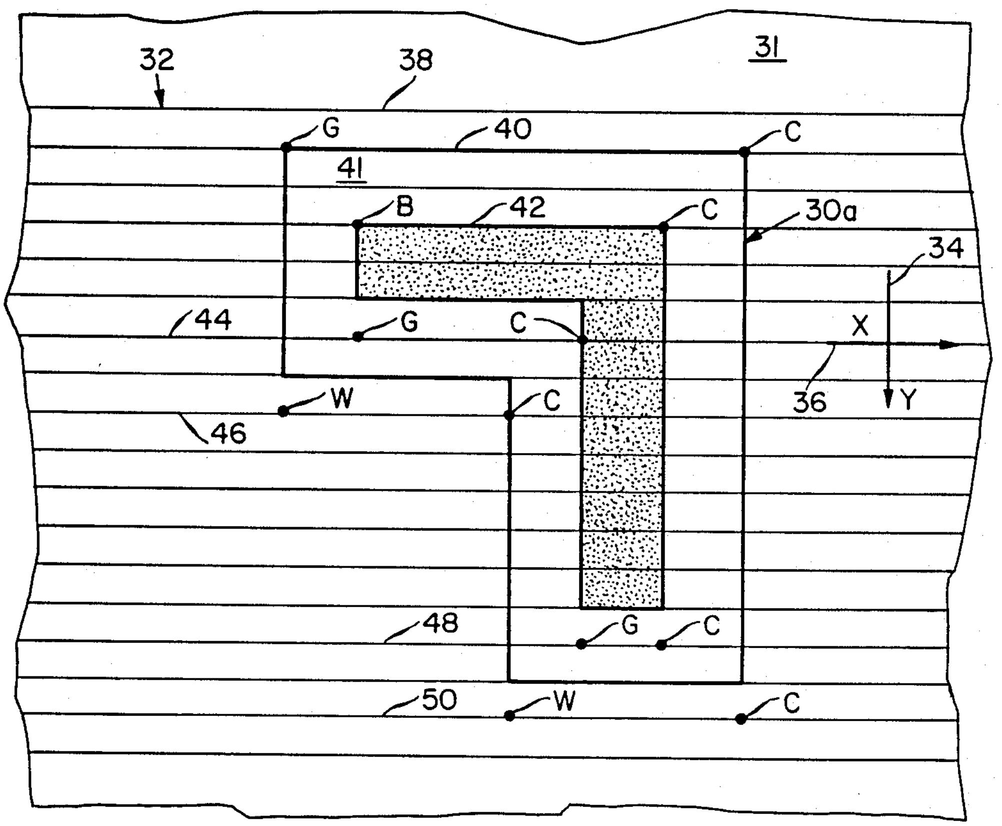
FIG. 2B is a schematic top plan view of an image of a segment of copper wire on a printed wiring board illustrating maximum and minimum acceptable dimensions of the wire.

Image 31, FIG. 2B, is formed of successive lines 32 each being formed of successive pixels which are selectively updated to produce pattern 30*a*. Reference arrows 34, 36 indicate positive increase in the Y and X directions, respectively.

As is evident, a minimum of coordinates are required to define the presence of the three possible types of pixels. The pixels of line 38 are all white. On line 40, two commands are required, first a gray command to change pixels to gray in a tolerance region 41 and then a copy command to relieve the pixels in the rest of the line from updating. Further updating is not required until line 42 when a portion of the gray pixels within tolerance region 41 are replaced with black pixels. This new updated line can be successively provided as output until line 44 when a gray command indicates that another "do not care" tolerance region is reached. A copy command indicates that the remainder of the black pixels remain unaltered until line 48.

The end of the tolerance region 41 is indicated along line 46 by the white command. After the copy command along line 46, updating is not required until line 48 where the end of the black region is demarcated. Finally, along line 50, the remainder of the nonwhite pixels are replaced with white pixels which are copied repeatedly in successive lines to generate the remainder of image 31.

Figure 3:
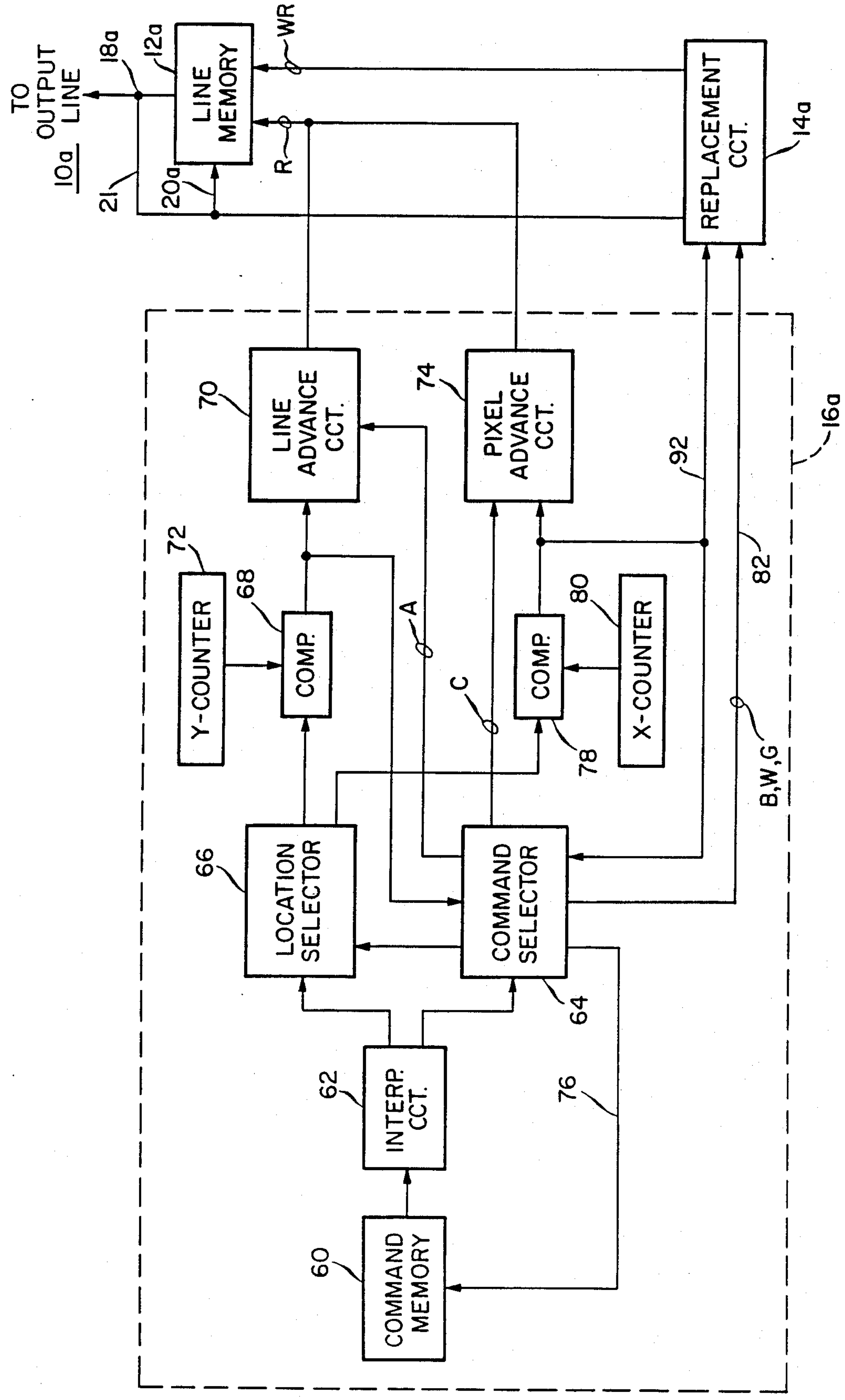
FIG. 3 is a more detailed diagram of another image generator according to this invention.

Image generator 10*a*, FIG. 3, represents another image generation system according to this invention. Control circuit 16*a* selectively controls delivery by replacement circuit 14*a* and line memory 12*a* to output juncture 18*a*. Command memory 60 stores pairs of pattern coordinate instructions, that is, x and y locations, and pattern reproduction instructions to be implemented at the respective coordinates. A pattern reproduction instruction includes a pixel replacement command, a line advance instruction, or a reproduction command such as shown in Table I. Command memory 60 provides one pair of instructions at a time to interpreting circuit 62 which directs the pattern reproduction instruction to command selector 64 and the pattern coordinate instruction to location selector 66.

For a line advance instruction, command selector 64 enables location selector 66 to provide the coordinate to comparator 68 and enables line advance circuit 70 which operates until disabled by comparator 68; comparator 68 provides a disable signal when the coordinate matches y-counter 72. In addition to the disable signal, comparator 68 also signals command selector 64 that the line advance instruction has been completed.

Line advance circuit 70 and pixel advance circuit 74 both provide an enabling read signal R to line memory 12*a*. In contrast, replacement circuit 14*a* when enabled provides write signal WR to memory 12*a*, provides one or more replacement values to output junction 18*a*, via line 21 and in addition updates line memory 12*a* through line 20*a*.

When the reproduction instruction received by command selector 64 is other than a line advance command, command selector 64 requests through line 76 that command memory 60 provide the next command pair to it. Command selector 64 causes location selector 66 to provide the next X location minus one to comparator 78. At the same time, command selector 64 enables pixel advance circuit 74 if the command is a pixel copy command or enables replacement circuit 14*a* if the command is a black, white or gray pixel replacement command. Pixel advance circuit 74 or replacement circuit 14*a*, respectively, then operates until the next X location minus one matches the count of x-counter 80. Comparator 78 signals command selector 64 when the respective advance circuit 74 or replacement circuit 14*a* is disabled.

Figure 4:
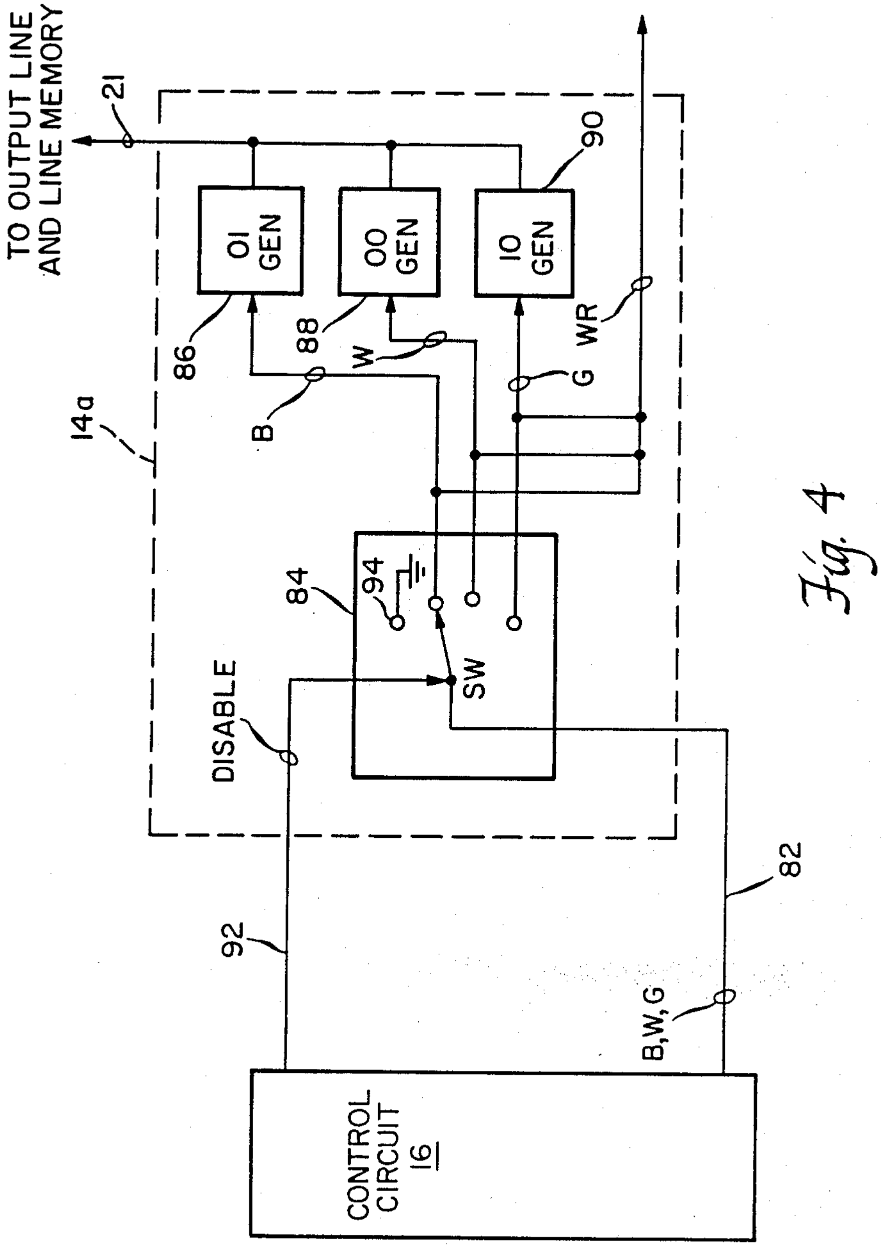
FIG. 4 is a more detailed diagram of the replacement circuit of FIG. 3.

Replacement circuit 14*a* is shown in greater detail in FIG. 4. Line 82 from command selector 64, FIG. 3, enters switching circuit 84 which commands switch SW to activate 01 generator 86 if a black pixel is to be produced, 00 generator 88 if a white pixel is to be produced, and 10 generator 90 for a gray pixel; replacement pixels are represented by two bits. In addition to enabling one of the pixel generators, 86, 88, or 90, switch SW also activates write signal WR which induces line memory 12*a* to write rather than read.

After switch SW is directed to one of the three terminals of the pixel generators, a disable signal on line 92 from comparator 78, FIG. 3, causes switch SW to contact ground 94 which inactivates the pixel generators. As described above, the disable signal is generated when the count of x-counter 72 reaches the next x-location minus one.

In operation, image generator 10*a*, FIG. 3, operates to successively read pixels out of memory 12*a* or to provide replacement pixels until the present operation is terminated by comparator 68 or comparator 78. Image generator 10*a* then immediately begins the next operation and continues without further command until the coordinate of the next reproduction instruction is reached.

Figure 5A:
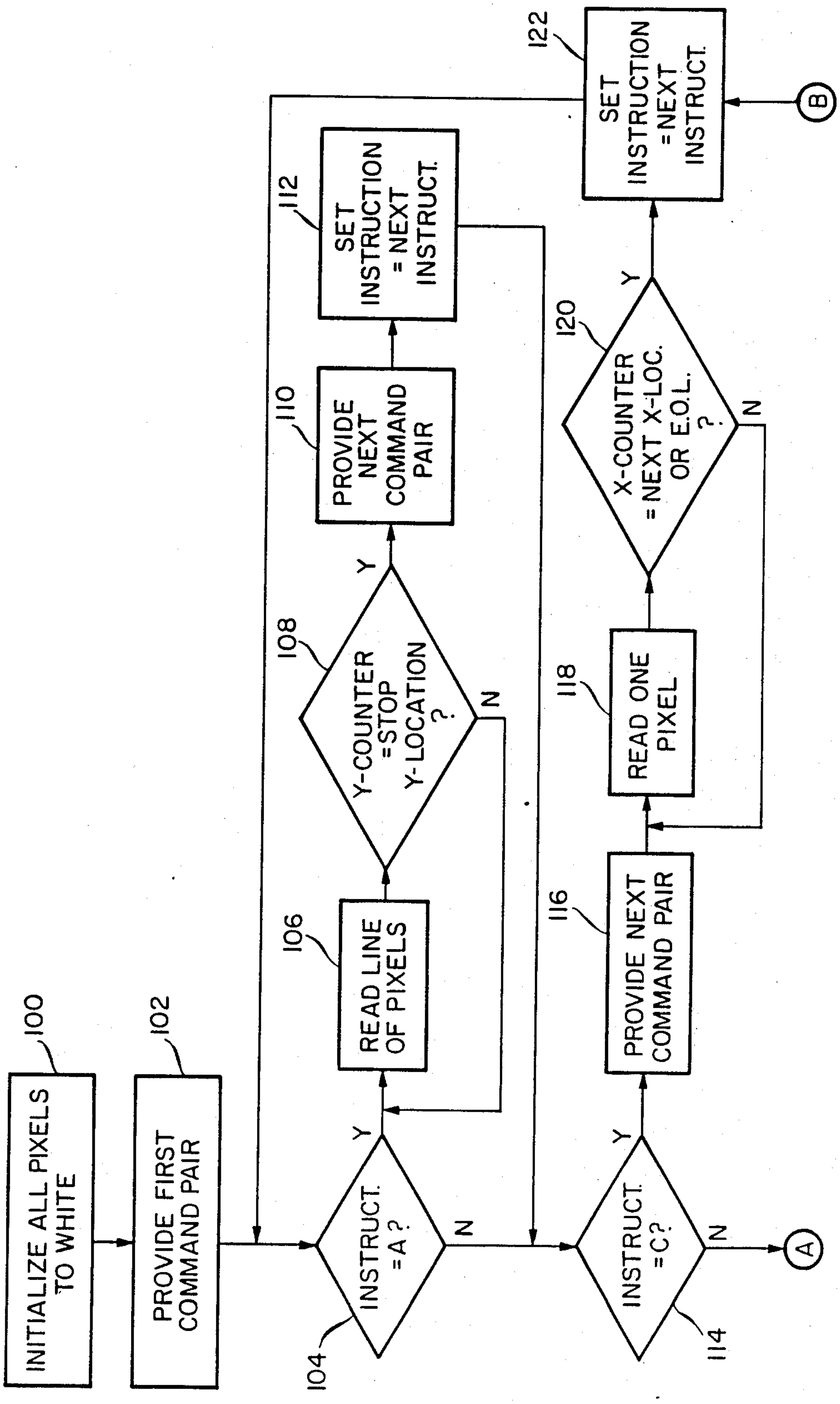
FIGS. 5A and 5B are flow charts of the operation of the image generator of FIG. 3.
Figure 5B:
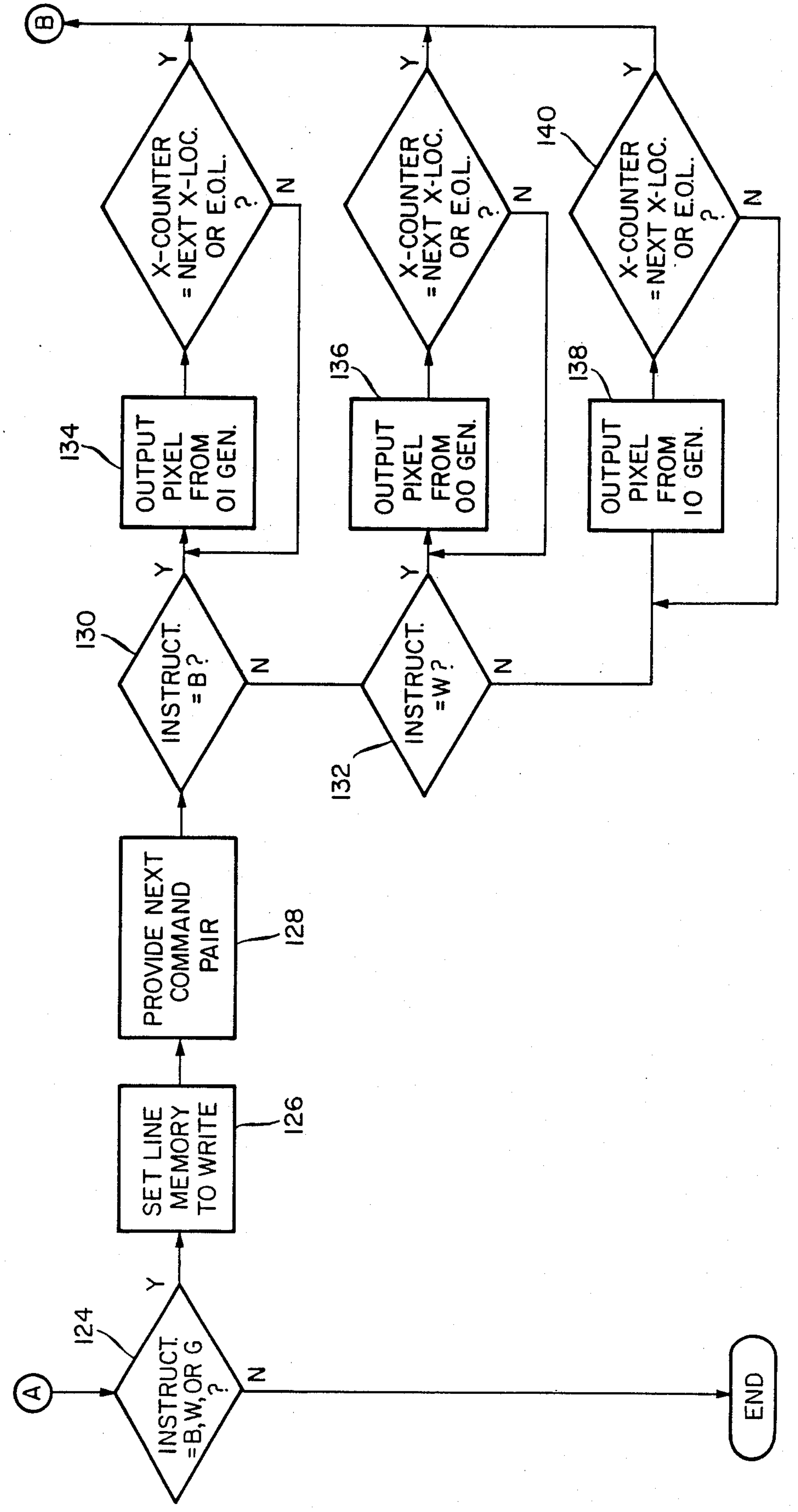

The operation of image generator 10*a* is summarized in FIGS. 5A and 5B. In operation, all the pixels are initialized to white, step 100, when the image to be displayed represents a colored pattern on a white background. The first command pair is provided, step 102, and the reproduction instruction is successively examined to identify it. If the instruction is determined to be a line advance command, step 104, the line of pixels is read out of line memory 12*a*, step 106, and the y-counter is compared, step 108, to the stop y-location, that is, the pattern coordinate instruction indicating the line up to which image generator 10a must read. Lines of pixels are successively read out until the y-counter matches the stop location at which point the next command pair is provided and the present instruction is set to be the next instruction, steps 110, 112, respectively. The new instruction is inspected in step 114 to determine if it is a pixel copy instruction. If it is, the next command pair is provided and one pixel is read, steps 116, 118, respectively. The x counter is compared to the next x location or to the end of line coordinate EOL, step 120, and pixels are successively read out until the counter reaches the next location or end of the line. When this occurs, the next instruction is designated as the present instruction, step 122, and the instruction examined again. If the instruction is neither a line advance instruction nor a pixel copy instruction, decision point 124 is reached, FIG. 5B. If the instruction is a pixel replacement instruction, line memory is set to write and the next command pair is provided, steps 126 and 128, respectively.

The replacement instruction is examined in steps 130 and 132 and identified as a black,a white, or a gray pixel instruction. A black or white instruction induces an appropriate pixel output from 01 generator or 00 generator, steps 134 or 136, respectively. The appropriate operation continues until the x-counter matches the next coordinate instruction at which point step 122 is commenced. If the instruction is neither a black nor a white instruction and only three types of replacement pixels are possible, output is provided from 10 generator, step 138, which continues until the x-counter matches the next x-location or end of line, step 140.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A system for rapidly generating an image of a pattern in successive lines, each line being formed of a plurality of pixels, in which each pixel is represented by a pixel value, said system comprising:

- means for storing the pixel values of a previously generated line;
- means for producing one or more replacement pixel values;
- output means for providing successively generated lines of the image;
- control means for selectively delivering output of said means for storing and said means for producing to said output means in accordance with commands defining the boundaries of the pattern to generate the successive lines of the image; and
- means for updating said means for storing with the replacement pixel values from said means for producing.

2. The image generation system of claim 1 in which said means for producing, responsive to said control means, produces for each output to be delivered one of a plurality of types of replacement pixels.

3. The image generation system of claim 2 in which said control means includes means for providing commands defining the pattern by its corner-coordinates.

4. The image generation system of claim 3 in which said means for providing includes command memory means for storing the defining commands.

5. The image generation system of claim 3 in which said control means further includes means for interpreting the defining commands into successive pairs of pattern coordinate instructions and pattern reproduction instructions.

6. The image generation system of claim 5 in which said control means selectively delivers the output of said means for storing and said means for producing in response to each pattern reproduction instruction when its respective pattern coordinate instruction is met.

7. The image generation system of claim 5 in which said control means further includes means for decoding the pattern coordinate instructions into line position instructions and pixel position instructions.

8. The image generation system of claim 7 in which said control means further includes means for decoding the pattern reproduction instructions into line advance instructions, pixel copy instructions, and pixel alteration instructions.

9. The image generation system of claim 8 in which said control means further includes advancement means, responsive to said line advance instructions and said line position instructions, for enabling said control means to deliver the entire output of said means for storing to said output means.

10. The image generation system of claim 8 in which said control means further includes copy means, responsive to said pixel copy instructions and said pixel position instructions, for enabling said control means to deliver one or more successive pixels values from said means for storing to said output means.

11. The image generation system of claim 8 in which said control means further includes replacement pixel directing means, responsive to said pixel alteration instructions and said pixel position instructions, for enabling said means for producing to produce one or more successive directed replacement pixel values.

12. The image generation system of claim 3 in which said means for providing produces a series of preselected commands defining a wire pattern on a printed wiring board.

13. The image generation system of claim 12 in which the pixel values represent the presence and absence of wire on the board.

14. The image generation system of claim 1 in which said control means includes pixel counter means for indicating pixel position as the pixel values are successively delivered.

15. The image generation system of claim 1 in which said control means includes line counter means for indicating line position as the lines are successively delivered.

16. The image generation system of claim 1 in which said control means includes initializing means for directing said means for producing and said means for updating to set all of the pixel values stored in said means for storing to the same value.

17. The image generation system of claim 1 in which said output means includes output memory means for storing the line most recently delivered.

18. The image generation system of claim 17 in which said means for updating is responsive to said output memory means to accomplish updating of said means for storing the previous line.

19. A system for rapidly generating an image of a pattern in successive lines, each line being formed of a plurality of pixels, in which each pixel is represented by a pixel value, comprising:

means for storing the pixel values of a previously generated line;

means for producing replacement pixel values of one of a plurality of types of pixel values;

control means for selectively delivering output of said means for storing and said means for producing to output means in accordance with commands defining the boundaries of the pattern to generate the successive lines of the image, said control means directing the type of replacement pixel value produced by said means for producing for each output to be delivered; and means for updating said means for storing with the replacement pixel values from said means for producing.

20. A method of rapidly generating an image of a pattern in which the image is formed of successive lines, each line being formed of a plurality of pixels in which each pixel is represented by a pixel value, the method comprising:

providing a series of commands defining the boundaries of the pattern;

storing pixel values of a line of the image;

successively identifying, as instructed by the defining commands, stored pixel values as values to be read out or values to be altered;

successively reading out unaltered the stored pixel values identified to be read out;

altering the one or more pixel values identified to be altered;

storing each altered pixel value to replace its respective unaltered pixel value for modifying the line stored; and providing the stored pixel values to be read out and the altered pixel values to generate the successive lines of the image as defined by the series of commands.

* * * * *